United States Patent
Lin et al.

(10) Patent No.: US 10,459,869 B2
(45) Date of Patent: Oct. 29, 2019

(54) ELECTRONIC APPARATUS AND OPERATION METHOD THEREOF

(71) Applicant: HIMAX TECHNOLOGIES LIMITED, Tainan (TW)

(72) Inventors: Yu-Chun Lin, Tainan (TW); Yi-Long Yang, Tainan (TW); Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 15/844,604

(22) Filed: Dec. 17, 2017

(65) Prior Publication Data

US 2019/0188177 A1 Jun. 20, 2019

(51) Int. Cl.
*G06F 13/42* (2006.01)
(52) U.S. Cl.
CPC ................................ *G06F 13/4221* (2013.01)
(58) Field of Classification Search
None
See application file for complete search history.

(56) References Cited

U.S. PATENT DOCUMENTS

| 2008/0100368 | A1* | 5/2008 | Ryu | H04L 25/03885 |
| | | | | 327/513 |
| 2008/0201507 | A1* | 8/2008 | Krampl | G06F 13/4291 |
| | | | | 710/104 |
| 2017/0168978 | A1* | 6/2017 | Mishra | G06F 9/4411 |

* cited by examiner

*Primary Examiner* — Idriss N Alrobaye
*Assistant Examiner* — Dayton Lewis-Taylor
(74) *Attorney, Agent, or Firm* — JCIPRNET

(57) ABSTRACT

An electronic apparatus is provided. The electronic apparatus includes a first integrated circuit (IC) and a second IC. The direction pin of the first IC outputs a direction control signal to the direction pin of the second IC. The first IC takes a control right when the direction control signal is in a first logic state. The clock pin of the first IC outputs a first clock signal to the clock pin of the second IC when the first IC takes the control right. The second IC takes the control right when the direction control signal is in a second logic state. The clock pin of the second IC outputs a second clock signal to the clock pin of the first IC when the second IC takes the control right.

12 Claims, 4 Drawing Sheets

US 10,459,869 B2

ELECTRONIC APPARATUS AND OPERATION METHOD THEREOF

BACKGROUND OF THE INVENTION

Field of the Invention

The invention relates to an electronic apparatus and an operation method thereof.

Description of Related Art

When two integrated circuits (ICs) operate in collaboration with each other, besides a data transmission pin, an extra control pin is required to transmit a specific control signal. Generally, the more the number of the pins is, the higher the manufacturing cost of the IC is. Moreover, during the process that two ICs operate in collaboration with each other, one of the ICs plays a "master" role (controlling side), and the other IC plays a "slave" role (controlled side). In the conventional technique, the master and the slave are fixed. For example, in a master-slave structure, an IC A plays the "master" role (the controlling side), and an IC B plays the "slave" role (the controlled side). A clock signal required for synchronous operation is fixedly provided by the IC A, and the IC B receives the clock signal of the IC A to implement the collaborative operation. The IC B cannot be changed from the "slave" to the "master".

SUMMARY OF THE INVENTION

The invention is directed to an electronic apparatus and an operation method thereof, by which a control right is dynamically switched to one of a first integrated circuit and a second integrated circuit according to an operation requirement.

An embodiment of the invention provides an electronic apparatus including a first integrated circuit and a second integrated circuit. The first integrated circuit at least has a direction pin and a clock pin, where the direction pin of the first integrated circuit outputs a direction control signal. The second integrated circuit at least has a direction pin and a clock pin. The direction pin of the second integrated circuit is coupled to the direction pin of the first integrated circuit to receive the direction control signal. The clock pin of the second integrated circuit is coupled to the clock pin of the first integrated circuit. The first integrated circuit takes a control right when the direction control signal is in a first logic state. The clock pin of the first integrated circuit outputs a first clock signal to the clock pin of the second integrated circuit when the first integrated circuit takes the control right. The second integrated circuit takes the control right when the direction control signal is in a second logic state. The clock pin of the second integrated circuit outputs a second clock signal to the clock pin of the first integrated circuit when the second integrated circuit takes the control right.

An embodiment of the invention provides an operation method of an electronic apparatus. The electronic apparatus includes a first integrated circuit and a second integrated circuit. The operation method includes: outputting a direction control signal to a direction pin of the second integrated circuit by a direction pin of the first integrated circuit; taking a control right by the first integrated circuit when the direction control signal is in a first logic state; outputting a first clock signal to a clock pin of the second integrated circuit by a clock pin of the first integrated circuit when the first integrated circuit takes the control right; taking the control right by the second integrated circuit when the direction control signal is in a second logic state; and outputting a second clock signal to the clock pin of the first integrated circuit by the clock pin of the second integrated circuit when the second integrated circuit takes the control right.

According to the above description, the electronic apparatus and the operation method thereof may dynamically switch a control right to one of the first integrated circuit and the second integrated circuit through the direction control signal. When the first integrated circuit takes the control right, the first integrate circuit may output the first clock signal to the second integrated circuit. When the second integrated circuit takes the control right, the second integrate circuit may output the second clock signal to the first integrated circuit.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
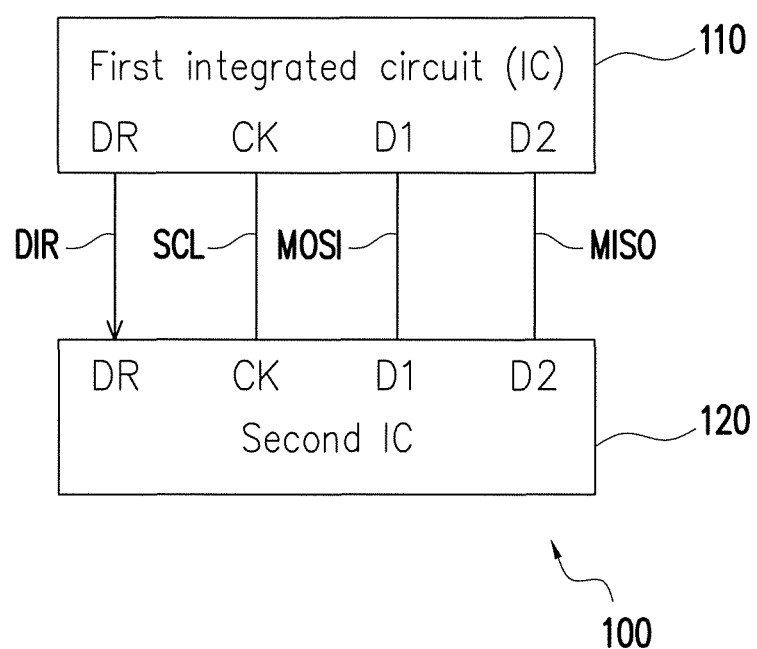
FIG. 1 is a circuit block schematic diagram of an electronic apparatus according to an embodiment of the invention.

A Wan "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a circuit block schematic diagram of an electronic apparatus 100 according to an embodiment of the invention. The electronic apparatus 100 includes a first integrated circuit (IC) 110 and a second IC 120. The first IC 110 at least has a direction pin DR, a clock pin CK, a first data pin D1 and a second data pin D2. The second IC 120 at least has a direction pin DR, a clock pin CK, a first data pin D1 and a second data pin D2. According to a design requirement, the first IC 110 may be further configured with other pins, and the second IC 120 may also be configured with other pins.

The direction pin DR of the first IC 110 outputs a direction control signal DIR. The direction pin DR of the second IC 120 is coupled to the direction pin DR of the first IC 110 to receive the direction control signal DIR. The clock pin CK of the second IC 120 is coupled to the clock pin CK of the first IC 110. The first data pin D1 of the second IC 120 is coupled to the first data pin D1 of the first IC 110. The second data pin D2 of the second IC 120 is coupled to the second data pin D2 of the first IC 110.

Figure 2:
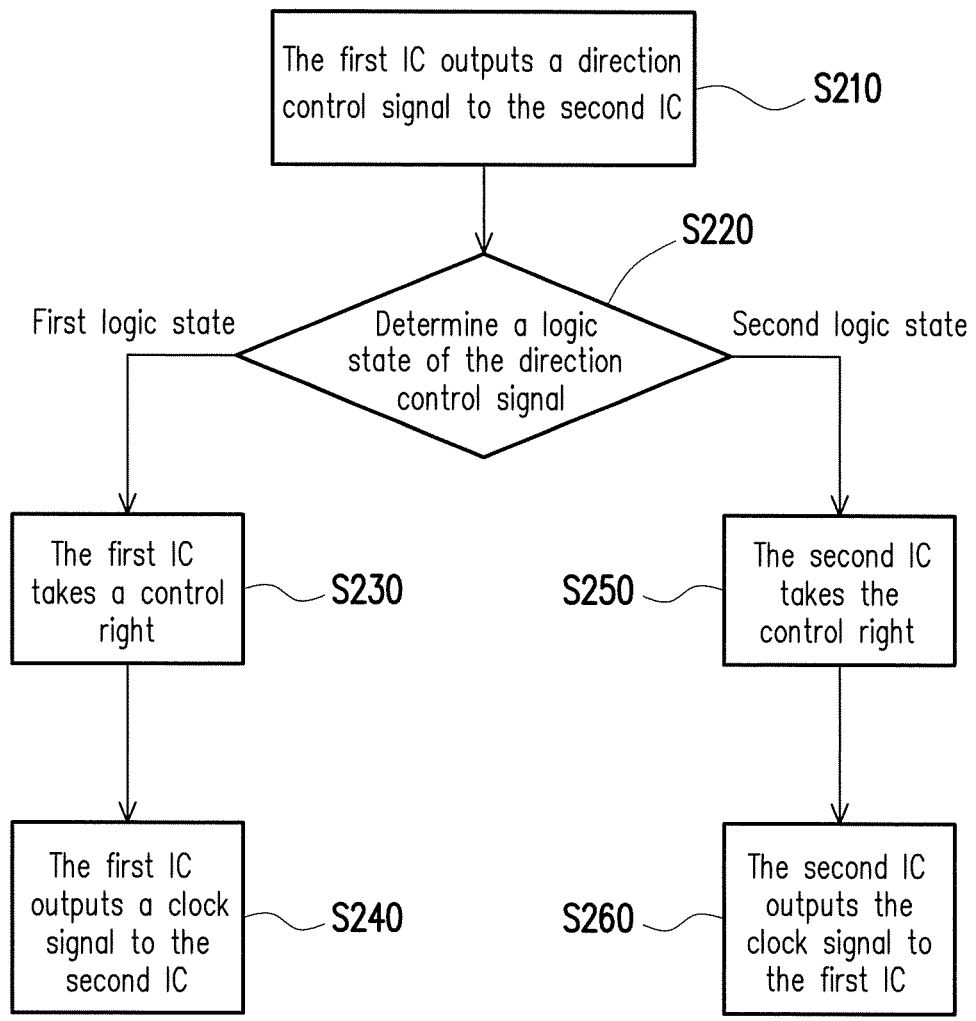
FIG. 2 is a flowchart illustrating an operation method of the electronic apparatus according to an embodiment of the invention.

FIG. 2 is a flowchart illustrating an operation method of the electronic apparatus according to an embodiment of the invention. Referring to FIG. 1 and FIG. 2, in step S210, the direction pin DR of the first IC 110 outputs the direction control signal DIR to the direction pin DR of the second IC 120. In step S220, a logic state of the direction control signal DIR is determined. When the determination result of the step S220 indicates that the direction control signal DIR is in a first logic state, a step S230 is executed. When the determination result of the step S220 indicates that the direction control signal DIR is in a second logic state, a step S250 is executed.

The first logic state and the second logic state may be determined according to an actual design requirement. For example, in an embodiment, the first logic state may be a logic state "1" (for example, a high logic level), and the second logic state may be a logic state "0" (for example, a low logic level). In another embodiment, the first logic state may be the logic state "0", and the second logic state may be the logic state "1".

An initial state of the direction control signal DIR may be determined according to an actual design requirement. For example, in an embodiment, the initial state of the direction control signal DIR may be the second logic state. In another embodiment, the initial state of the direction control signal DIR may be the first logic state.

When the direction control signal DIR is in the first logic state, the first IC 110 takes a control right in the step S230. When the first IC 110 takes the control right, the clock pin CK of the first IC 110 outputs a clock signal SCL to the clock pin CK of the second IC 120 in step S240. When the direction control signal DIR is in the second logic state, the second IC 120 takes the control right in the step S250. When the second IC 120 takes the control right, the clock pin CK of the second IC 120 outputs the clock signal SCL to the clock pin CK of the first IC 110 in step S260.

Therefore, the control right may be dynamically switched to one of the first IC 110 and the second IC 120 through the direction control signal DIR. For example, in a master-slave structure, the first IC 110 that takes the control right may serve as a "master" role (controlling side), and the second IC 120 serves as a "slave" role (controlled side). When the first IC 110 takes the control right, the first IC 110 may output the clock signal SCL to the second IC 120. After the control right is dynamically switched from the first IC 110 to the second IC 120, the second IC 120 that takes the control right may serve as the "master" role (the controlling side), and the first IC 110 serves as the "slave" role (the controlled side). When the second IC 120 takes the control right, the second IC 120 may output the clock signal SCL to the first IC 110. Based on the clock signal SCL, the first IC 110 and the second IC 120 may operate in collaboration with each other.

When the first IC 110 takes the control right, the first data pin D1 of the first IC 110 serves as a data output pin of the first IC 110, and the first data pin D1 of the second IC 120 serves as a data input pin of the second IC 120. Therefore, the first IC 110 that takes the control right may output a master data signal MOSI to the second IC 120. When the first IC 110 takes the control right, the second data pin D2 of the first IC 110 serves as the data input pin of the first IC 110, and the second data pin D2 of the second IC 120 serves as a data output pin of the second IC 120. Therefore, based on control of the first IC 110, the second IC 120 may output a slave data signal MISO to the first IC 110.

When the second IC 120 takes the control right, the first data pin D1 of the second IC 120 serves as a data output pin of the second IC 110, and the first data pin D1 of the first IC 110 serves as a data input pin of the first IC 110. Therefore, the second IC 120 that takes the control right may output the master data signal MOSI to the first IC 110. When the second IC 120 takes the control right, the second data pin D2 of the second IC 120 serves as the data input pin of the second IC 120, and the second data pin D2 of the first IC 110 serves as a data output pin of the first IC 110. Therefore, based on control of the second IC 120, the first IC 110 may output the slave data signal MISO to the second IC 120.

In the present embodiment, "when a signal of the clock pin CK is in a third logic state, a signal of the first data pin D1 is transited from a fourth logic state to a fifth logic state" is defined as a start signal. The start signal represents a start of a data transmission period. "When the signal of the clock pin CK is in the third logic state, the signal of the first data pin D1 is transited from the fifth logic state to the fourth logic state" is defined as a stop signal. The stop signal represents the end of the data transmission period. The third logic state, the fourth logic state and the fifth logic state may be set according to an actual design requirement. For example, in the present embodiment, the third logic state may be the logic state "1" (for example, the high logic level), the fourth logic state may be the logic state "1", and the fifth logic state may be the logic state "0" (for example, the low logic level). In another embodiment, the third logic state may be the logic state "0", the fourth logic state may be the logic state "0", and the fifth logic state may be the logic state "1".

Figure 3:
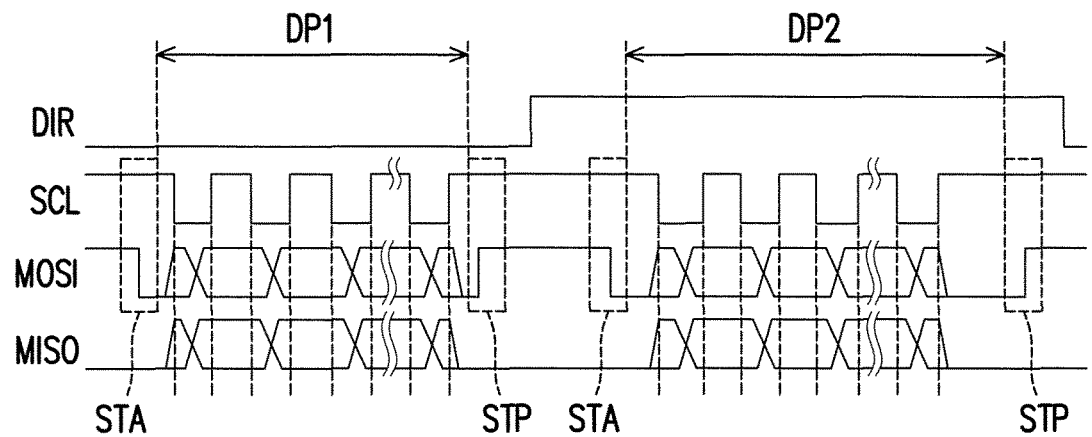
FIG. 3 is a timing diagram of signals of the circuit of FIG. 1 according to an embodiment of the invention.

FIG. 3 is a timing diagram of signals of the circuit of FIG. 1 according to an embodiment of the invention. Referring to FIG. 1 and FIG. 3, in the embodiment of FIG. 3, "when the clock signal SCL of the clock pin CK is in the logic state 1 (for example, the high logic level), the master data signal MOSI of the first data pin D1 is transited from the logic state 1 to the logic state 0 (for example, the low logic level)" is defined as a start signal STA, and "when the clock signal SCL is in the logic state 1, the master data signal MOSI is transited from the logic state 0 to the logic state 1" is defined as a stop signal STP. The start signal STA represents the start of the data transmission period, and the stop signal STP represents the end of the data transmission period.

In the embodiment of FIG. 3, an initial state of the direction control signal DIR is assumed to be the logic state "0" (for example, the low logic level). When the direction control signal DIR is in the logic state "0", the second IC 120 takes the control right. When the second IC 120 takes the control right (i.e. when the direction control signal DIR is in the logic state "0"), the second IC 120 may output the clock signal SCL to the first IC 110, and the second IC 120 may output the start signal STA to the first IC 110 to activate a data transmission period DP1. In the data transmission period DP1, a pulse width (a time length of continuous high logic level) of the clock signal SCL or a trough width (a time length of continuous low logic level) is smaller than a threshold width, where the threshold width may be determined according to an actual design requirement. In the data transmission period DP1, the second IC 120 may output the master data signal MOSI to the first IC 110, and the first IC 110 may output the slave data signal MISO to the second IC 120. In the data transmission period DP1, the master data signal MOSI may be transited when the clock signal SCL is in the low logic level, and the master data signal MOSI is not transited when the clock signal SCL is in the high logic level. Operation of the slave data signal MISO may be deduced according to related description of the master data signal MOSI. The second IC 120 may output the stop signal STP to the first IC 110 to end the data transmission period DP1.

The first IC 110 may pull up the direction control signal DIR to the logic state 1 (for example, the high logic level) to take back control from the second IC 120. When the first IC 110 takes the control right (i.e. when the direction control signal DIR is in the logic state "1"), the first IC 110 may output the clock signal SCL to the second IC 120, and the first IC 110 may output the start signal STA to the second IC 120 to activate the data transmission period DP2. During the data transmission period DP2, the first IC 110 may output the master data signal MOSI to the second IC 120, and the second IC 120 may output the slave data signal MISO to the first IC 110. Operations of the clock signal SCL, the master data signals MOSI and the slave data signal MISO in the data transmission period DP2 may be deduced with reference of related description of the data transmission period DP1. The first IC 110 may output the stop signal STP to the second IC 120 to end the data transmission period DP2.

It is assumed that a pulse width (or a trough width) of the clock signal SCL during the data transmission period (e.g., the data transmission period DP1 or the data transmission period DP2 shown in FIG. 3) is smaller than a threshold width. The threshold width may be determined according to an actual design requirement. In the embodiment of FIG. 1, "when the first IC 110 takes the control right, the pulse width (or the trough width) of the clock signal SCL is greater than the threshold width" is defined as one reset signal. The first IC 110 may reset the second IC 120 through the reset signal. In this way, the first IC 110 (the second IC 120) may omit an additional reset pin.

Figure 4:
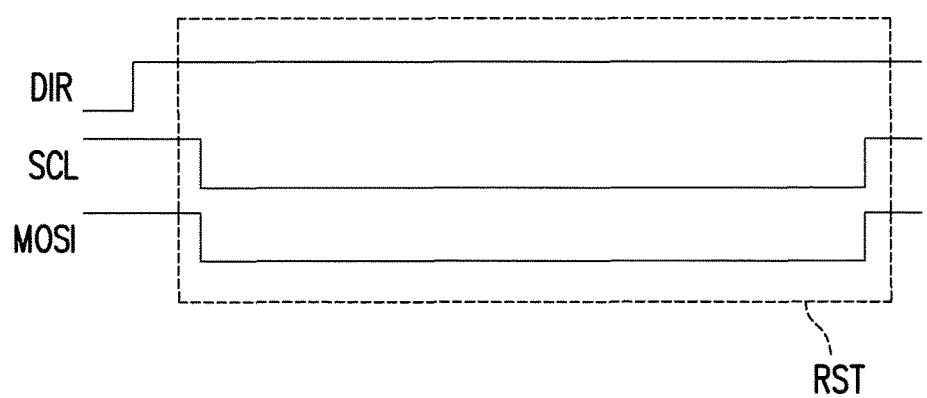
FIG. 4 is a timing diagram of signals of the circuit of FIG. 1 according to another embodiment of the invention.

FIG. 4 is a timing diagram of signals of the circuit of FIG. 1 according to another embodiment of the invention. Referring to FIG. 1 and FIG. 4, in the embodiment of FIG. 4, "when the first IC 110 takes the control right (i.e. when the direction control signal DIR is in the logic state "1"), the clock signal SCL and/or the master data signal MOSI is pulled down and continuously exceeds the threshold width (for example, for over 1 ms)" is defined as a reset signal RST. The first IC 110 may reset the second IC 120 through the reset signal RST.

Figure 5:
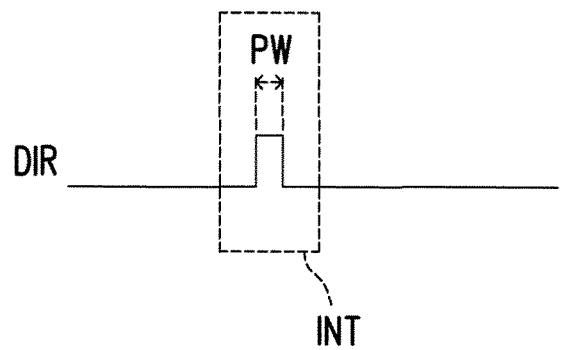
FIG. 5 is a timing diagram of signals of the circuit of FIG. 1 according to still another embodiment of the invention.

FIG. 5 is a timing diagram of signals of the circuit of FIG. 1 according to still another embodiment of the invention. Referring to FIG. 1 and FIG. 5, in the embodiment of FIG. 5, "the pulse width PW of the direction control signal DIR falls within a width range" is defined as an interrupt signal INT. The width range may be determined according to an actual design requirement. For example, the width range may be 1 µs to 10 µs. The first IC 110 may notify an interrupt request to the second IC 120 through the interrupt signal INT. In this way, the first IC 110 (the second IC 120) may omit an additional interrupt pin.

Figure 6:
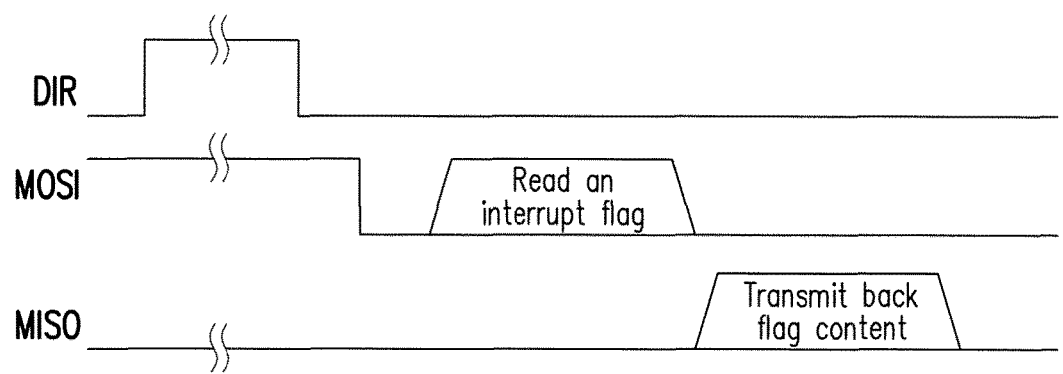
FIG. 6 is a timing diagram of signals of the circuit of FIG. 1 according to still another embodiment of the invention.

FIG. 6 is a timing diagram of signals of the circuit of FIG. 1 according to still another embodiment of the invention. Referring to FIG. 1 and FIG. 6, it is assumed that the first IC 110 has an interrupt flag (or an interrupt register). In the embodiment of FIG. 6, when the second IC 120 takes the control right from the first IC 110 (i.e. after the direction control signal DIR is transited from the logic state "1" to the logic state "0"), the second IC 120 first requests to read the interrupt flag (or the interrupt register) of the first IC 110 through the master data signal MOSI. Based on the request/control of the second IC 120, the first IC 110 transmits back the content of the interrupt flag (or the interrupt register) to the second IC 120 through the slave data signal MISO. According to the content of the interrupt flag (or the interrupt register), the second IC 120 may learn whether the first IC 110 proposes the interrupt request. In this way, the first IC 110 (the second IC 120) may omit the additional interrupt pin.

It should be noted that in different applications, related functions of the first IC 110 and/or the second IC 120 may be implemented as software, firmware or hardware by using general programming languages (for example, C or C++), hardware description languages (for example, Verilog HDL or VHDL) or other suitable programming languages. The programming languages capable of implementing the related functions can be stored in any computer-assessable medias, for example, magnetic tapes, semiconductor memories, magnetic disks or compact disks, for example, CD-ROM or DVD-ROM, or the programming languages may be transmitted through the Internet, wired communication, wireless communication or other communication media. The programming languages may be stored in the computer-assessable medias to facilitate a processor of the computer to access/execute programming codes of the software (or firmware). Regarding hardware implementations, one or a plurality of controllers, micro controllers, microprocessors, application-specific integrated circuits (ASIC), digital signal processors (DSP), field programmable gate arrays (FPGA) and/or various logic blocks, modules and circuits in other processing unit may be used for implementing or executing the functions of the present embodiment. Moreover, the apparatus and the method of the invention may be implemented through a combination of hardware and software.

In summary, the electronic apparatus 100 and the operation method thereof of the aforementioned embodiments may dynamically switch the control right to one of the first IC 110 and the second IC 120 through the direction control signal DIR. When the first IC 110 takes the control right, the first IC 110 may output the clock signal SCL to the second IC 120, and the first IC 110 may output the master data signal MOSI to the second IC 120. Based on control of the first IC 110 that takes the control right, the second IC 120 may output the slave data signal MISO to the first IC 110. When the second IC 120 takes the control right, the second IC 120 may output the clock signal SCL to the first IC 110, and the second IC 120 may output the master data signal MOSI to the first IC 110. Based control of the second IC 120 that takes the control right, the first IC 110 may output the slave data signal MISO to the second IC 120.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic apparatus, comprising:
   a first integrated circuit, at least having a direction pin and a clock pin, wherein the direction pin of the first integrated circuit outputs a direction control signal; and a second integrated circuit, at least having a direction pin and a clock pin, wherein the direction pin of the second integrated circuit is coupled to the direction pin of the first integrated circuit to receive the direction control signal, and the clock pin of the second integrated circuit is coupled to the clock pin of the first integrated circuit, wherein the first integrated circuit takes the control right when the direction control signal is in a first logic state, the clock pin of the first integrated circuit outputs a first clock signal to the clock pin of the second integrated circuit when the first integrated circuit takes the control right, the second integrated circuit takes the control right when the direction control signal is in a second logic state, and the clock pin of the second integrated circuit outputs a second clock signal to the clock pin of the first integrated circuit when the second integrated circuit takes the control right, wherein a pulse width of the first clock signal in a data transmission period is smaller than a threshold width, "when the first integrated circuit takes the control right, the pulse width of the first clock signal is greater than the threshold width" is defined as a reset signal, and the first integrated circuit resets the second integrated circuit through the reset signal.

2. The electronic apparatus as claimed in claim 1, wherein an initial state of the direction control signal is the second logic state.

3. The electronic apparatus as claimed in claim 1, wherein the first integrated circuit further has a first data pin and a second data pin, the second integrated circuit further has a first data pin and a second data pin, the first data pin of the second integrated circuit is coupled to the first data pin of the first integrated circuit, and the second data pin of the second integrated circuit is coupled to the second data pin of the first integrated circuit, wherein when the first integrated circuit takes the control right, the first data pin of the first integrated circuit serves as a data output pin of the first integrated circuit, the first data pin of the second integrated circuit serves as a data input pin of the second integrated circuit, the second data pin of the first integrated circuit serves as a data input pin of the first integrated circuit, and the second data pin of the second integrated circuit serves as a data output pin of the second integrated circuit; and wherein when the second integrated circuit takes the control right, the first data pin of the second integrated circuit serves as a data output pin of the second integrated circuit, the first data pin of the first integrated circuit serves as a data input pin of the first integrated circuit, the second data pin of the second integrated circuit serves as a data input pin of the second integrated circuit, and the second data pin of the first integrated circuit serves as a data output pin of the first integrated circuit.

4. The electronic apparatus as claimed in claim 3, wherein "when signal of the clock pins is in a third logic state, signal of the first data pins is transited from a fourth logic state to a fifth logic state" is defined as a start signal, the start signal represents a start of a data transmission period, and "when the signal of the clock pins is in the third logic state, the signal of the first data pins is transited from the fifth logic state to the fourth logic state" is defined as a stop signal, and the stop signal represents an end of the data transmission period.

5. The electronic apparatus as claimed in claim 1, wherein "a pulse width of the direction control signal falls within a width range" is defined as an interrupt signal, and the first integrated circuit notifies an interrupt request to the second integrated circuit through the interrupt signal.

6. The electronic apparatus as claimed in claim 1, wherein the first integrated circuit has an interrupt flag, and when the second integrated circuit takes the control right from the first integrated circuit, the second integrated circuit first reads the interrupt flag of the first integrated circuit to learn whether the first integrated circuit proposes an interrupt request.

7. An operation method of an electronic apparatus, wherein the electronic apparatus comprises a first integrated circuit and a second integrated circuit, the operation method comprising:

outputting a direction control signal to a direction pin of the second integrated circuit by a direction pin of the first integrated circuit;

taking a control right by the first integrated circuit when the direction control signal is in a first logic state;

outputting a first clock signal to a clock pin of the second integrated circuit by a clock pin of the first integrated circuit when the first integrated circuit takes the control right, wherein a pulse width of the first clock signal in a data transmission period is smaller than a threshold width;

taking the control right by the second integrated circuit when the direction control signal is in a second logic state;

outputting a second clock signal to the clock pin of the first integrated circuit by the clock pin of the second integrated circuit when the second integrated circuit takes the control right; and defining "when the first integrated circuit takes the control right, the pulse width of the first clock signal is greater than the threshold width" as a reset signal, wherein the first integrated circuit resets the second integrated circuit through the reset signal.

8. The operation method of the electronic apparatus as claimed in claim 7, wherein an initial state of the direction control signal is the second logic state.

9. The operation method of the electronic apparatus as claimed in claim 7, wherein a first data pin of the second integrated circuit is coupled to a first data pin of the first integrated circuit, and a second data pin of the second integrated circuit is coupled to a second data pin of the first integrated circuit, wherein when the first integrated circuit takes the control right, the first data pin of the first integrated circuit serves as a data output pin of the first integrated circuit, the first data pin of the second integrated circuit serves as a data input pin of the second integrated circuit, the second data pin of the first integrated circuit serves as a data input pin of the first integrated circuit, and the second data pin of the second integrated circuit serves as a data output pin of the second integrated circuit, and wherein when the second integrated circuit takes the control right, the first data pin of the second integrated circuit serves as a data output pin of the second integrated circuit, the first data pin of the first integrated circuit serves as a data input pin of the first integrated circuit, the second data pin of the second integrated circuit serves as a data input pin of the second integrated circuit, and the second data pin of the first integrated circuit serves as a data output pin of the first integrated circuit.

10. The operation method of the electronic apparatus as claimed in claim 9, further comprising:

defining "when signal of the clock pins is in a third logic state, signal of the first data pins is transited from a fourth logic state to a fifth logic state" as a start signal, wherein the start signal represents a start of a data transmission period; and defining "when the signal of the clock pins is in the third logic state, the signal of the first data pins is transited from the fifth logic state to the fourth logic state" as a stop signal, wherein the stop signal represents an end of the data transmission period.

11. The operation method of the electronic apparatus as claimed in claim 7, further comprising:

defining "a pulse width of the direction control signal falls within a width range" as an interrupt signal, wherein the first integrated circuit notifies an interrupt request to the second integrated circuit through the interrupt signal.

12. The operation method of the electronic apparatus as claimed in claim 7, wherein the first integrated circuit has an interrupt flag, and the operation method further comprises:

when the second integrated circuit takes the control right from the first integrated circuit, reading the interrupt flag of the first integrated circuit by the second integrated circuit first to learn whether the first integrated circuit proposes an interrupt request.

\* \* \* \* \*